Figure 1:
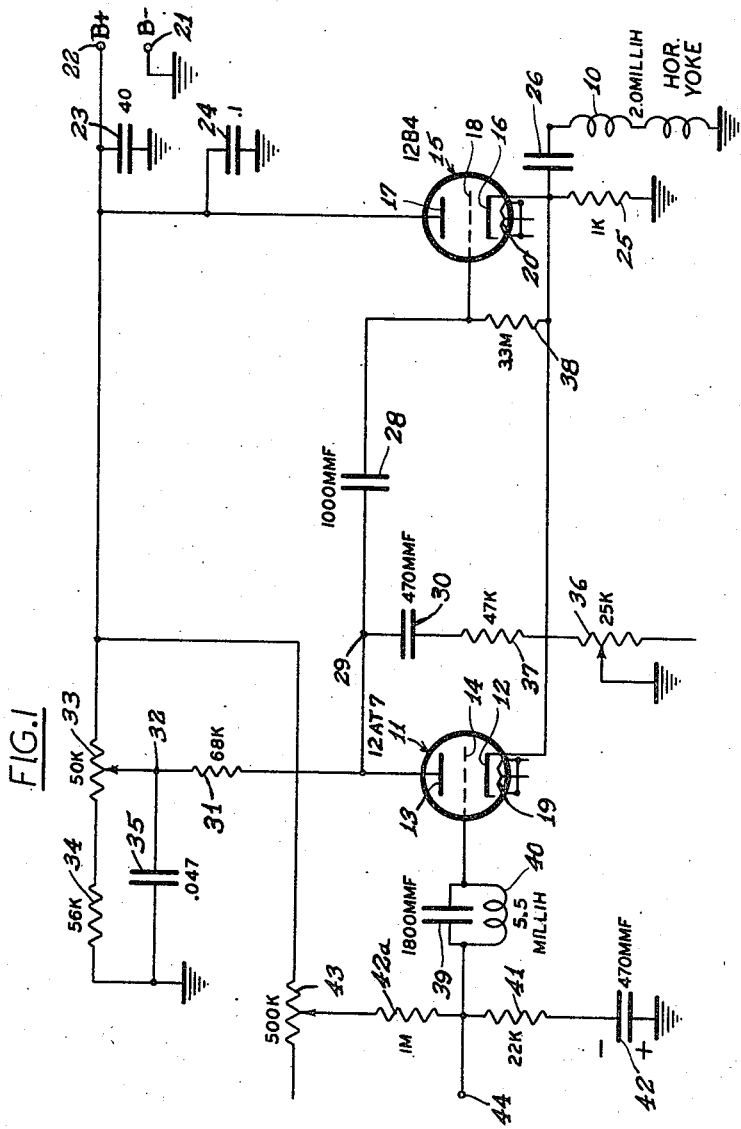

United States Patent Office 2,824,230
Patented Feb. 18, 1958

2,824,230

SWEEP CIRCUIT

George H. Fathauer, Decatur, Ill., assignor to Thompson Products, Inc., Cleveland, Ohio, a corporation of Ohio Application August 2, 1954, Serial No. 447,335

4 Claims. (Cl. 250—36)

This invention relates to a sweep circuit and more particularly to a sweep circuit for magnetic deflection yokes of television camera or picture tubes, oscilloscopes, and the like, in which the devices which generate the sweep wave forms are also the sweep oscillators.

The deflection of a cathode ray beam produced by magnetic deflection yokes is generally proportional to the current flow therethrough and for many applications, particularly in television circuits, it is necessary to deflect the cathode ray beam at a linear time rate across the face of the cathode ray tube and to thereafter deflect the beam back to its initial position in a relatively short time period. This requires a current wave of sawtooth form through the yoke.

The magnetic deflection yokes, of course, have substantial inductance and with a current wave of sawtooth form through such an inductive impedance, it will be found that the voltage thereacross is of a trapezoidal wave shape. Heretofore, it has been the practice to generate a timing signal, such as a series of pulses, apply such signal to wave-shaping circuits to produce a voltage wave of trapezoidal form and to then apply such voltage wave, usually after amplification, to the magnetic deflection yoke to produce the required deflection. Such circuit arrangements are complex, expensive and apt to get out of adjustment to become partially or wholly inoperative.

This invention was evolved with the object of satisfying a need for a sweep circuit for applying a current wave of sawtooth form to an inductive impedance which is simple, reliable, efficient and requires a minimum number of component parts.

In the sweep circuit of this invention, a control circuit is arranged for starting in an initial condition and then applying an increasing current through the inductive impedance, such as the magnetic yoke, and a timer circuit is arranged for periodically and abruptly restoring the control circuit to its initial condition to cause a sharp decrease in the current through the inductive impedance.

According to a particular feature of the invention, the control circuit and the timer circuit each comprise only a single space discharge device and such devices may act not only to generate the required wave form but also act as an oscillator, thus obviating the necessity for a separate oscillator and a separate circuit for generating the required wave form for a signal derived from the oscillator.

It may be noted that as used herein, the term space discharge device includes vacuum and gaseous valves or tubes which comprise at least a cathode and an anode and may comprise one or more grids interposed between the cathode and the anode. It is, of course, possible to place two or more of such discharge devices in a common envelope and it is contemplated that the discharge device of the control circuit and the discharge device of the timer circuit may be installed in a single envelope so that there will be only a single "tube" as that term is ordinarily applied in the art.

The timer circuit may be arranged for starting in an initial condition and after expiration of a predetermined time interval causing rapid restoration of the control circuit to its initial condition. Another feature of the invention is in the provision of means for restoring the timer circuit to its initial condition when the control circuit is restored to its initial condition.

A further and highly important feature of the present invention is in the provision of means for utilizing the energy stored in the inductive impedance to restore the timer circuit to its initial condition. With this arrangement, the necessity for separate means for restoring the timer circuit to its initial condition is obviated.

Other features of the invention reside in the provision of specific circuit arrangements in the timer and control circuits by which they are efficient, reliable and accurate in operation and require a minimum number of component parts.

Figure 2:
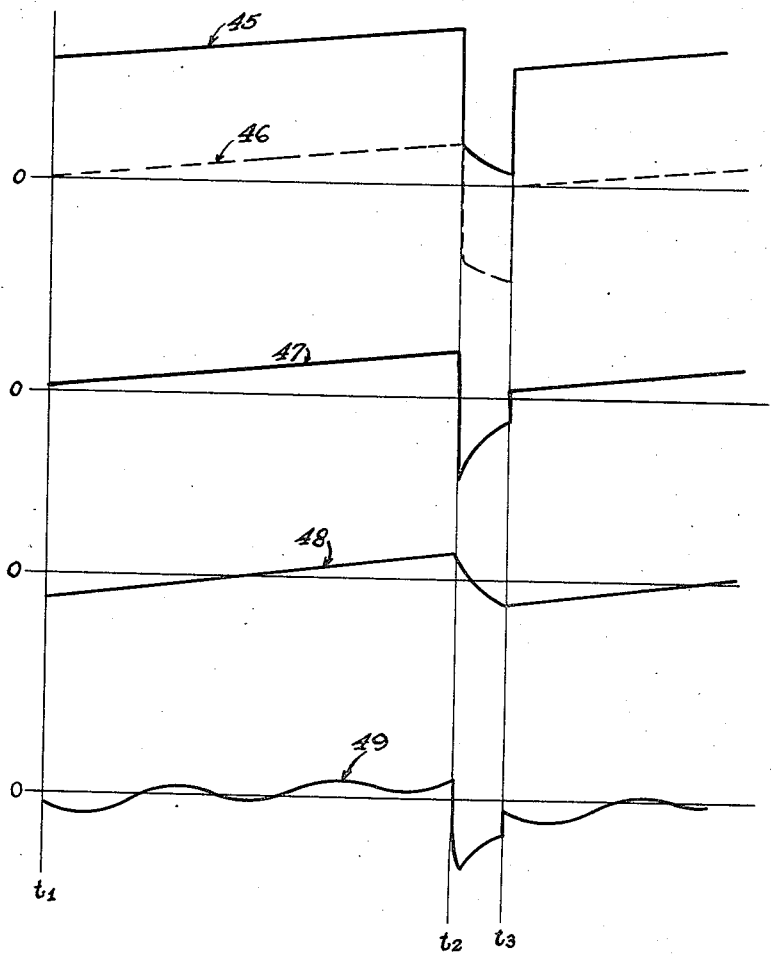

This invention contemplates other objects, features and advantages which will become more fully apparent from the following detailed description taken in conjunction with the accompanying drawings which illustrate a preferred embodiment and in which:

Figure 1 is a circuit diagram of one embodiment of this invention with approximate circuit values being indicated; and Figure 2 is a graphical illustration of the wave forms at certain points of the circuit of Figure 1.

Reference numeral 10 designates a magnetic deflection yoke which may be the horizontal deflection yoke of a television camera tube. In such cameras, as well as in television receivers and in many cathode ray tube applications it is desired that the cathode ray beam should move at a linear time rate across the face of the cathode ray tube and after traversing the face of the tube, the beam should be returned quickly to its initial position. The deflection with a magnetic yoke is proportional to the current flow through the yoke and in order to produce a deflection as above described, it is necessary to apply a current wave to the yoke of generally sawtooth form. This invention is concerned with the application of a current wave of such form to an inductive impedance such as the magnetic deflection yoke 10.

To apply such a sawtooth current wave, a control circuit is provided which is arranged to start in an initial condition and then apply an increasing current through the inductive impedance and a timer circuit is provided which is arranged for periodically and abruptly restoring the control circuit to its initial condition to cause a sharp decrease in the current through the inductive impedance.

According to a specific feature of the invention, the control circuit and the timer circuit may each comprise a single space discharge device. In particular, the timer circuit may comprise a triode vacuum tube 11 having an electron-emitting cathode 12, an anode 13 and a control electrode or grid 14 interposed between the cathode 12 and the anode 13 to control flow of electrons from the cathode 12 to the anode 13. The control circuit may comprise a tridoe vacuum tube 15 having a cathode 16, a plate or anode 17 and a grid 18.

If desired, the space discharge devices 11 and 15 could be in a common envelope. In an actual television camera circuit utilizing the sweep circuit of this invention, the discharge device 11 is one triode section of a type 12AT7 tube while the device of 15 is a type 12B4 tube. It will be further appreciated that the devices 11 and 15 may be provided with additional grids, so as to form tetrodes, pentodes, or the like, without affecting the general operation of the circuit. The devices 11 and 15 may have heaters 19 and 20, respectively, for indirectly heating the cathodes 12 and 16, which heaters may be connected to any desired source of power.

To provide D.-C. power for the circuit, a pair of terminals 21 and 22 may be respectively connected to the negative and positive sides of a suitable "B" supply. The negative terminal 21 may be connected directly to ground and to stabilize the supply, a capacitor 23 may be connected between the positive terminal 22 and ground. The capacitor 23 may be an electrolytic capacitor which may have appreciable inductance, and to insure by-pass of high frequencies, an auxiliary capacitor 24, which may be a paper type of capacitor, may be connected in parallel with the capacitor 23.

As previously indicated, the control circuit, which includes the space discharge device 15, is arranged to start in an initial condition and then apply an increasing current through the inductive impedance defined by the magnetic deflection yoke 10. For this purpose, the impedance 10 may respond to anode-cathode current through the device 15 and an increasing potential may be applied to the grid 18 of the device 15. To achieve a cathode-follower action and to achieve other advantages which will appear hereinafter, the impedance 10 may be connected between the cathode 16 and ground. The impedance 10 could be connected directly between the cathode 16 and ground without affecting the basic operation of the circuit, but preferably, the cathode 16 is connected to ground through a resistor 25 and is coupled to one side of the impedance 10 through a capacitor 26 with the other side of the impedance 10 being connected to ground. The purpose of this arrangement is to prevent application of a direct current component to the impedance 10, a direct current component being undesirable in most applications. The capacitance of the capacitor 26 should be sufficiently large so that at the frequencies of operation of the circuit, the operation is the same as though the impedance 10 were directly connected between cathode and ground. The anode 17 may be connected to the positive terminal 22, preferably directly through a conductor 27.

To apply an increasing potential to the control grid 18 of the device 15, the grid 18 may be coupled through a capacitor 28 to a circuit point 29 connected to one terminal of a capacitor 30, the other terminal of the capacitor 30 being connected to ground. Means are provided for gradually increasing the charge of the capacitor 30 so as to increase the potential of the circuit point 29 and thus the potential of the control grid 18 of the device 15. For this purpose, the circuit point 29 may be connected through a resistor 31 to a point 32 at a positive potential relative to ground. The point 32 may preferably be connected to the movable contact of a potentiometer 33 connected in series with a resistor 34 between the positive terminal 22 and ground. A by-pass capacitor 35 may be connected between the circuit point 32 and ground to stabilize the voltage at the point 32.

It will be appreciated that the capacitor 30 will be charged up from an uncharged condition at a rate dependent upon the potential of the circuit point 32 and the resistance in series with the capacitor 30 between ground and the circuit point 32. To adjust the charging rate of the capacitor 30, the potential of the circuit point 32 may be adjusted primarily by adjustment of the potentiometer 33. The charging rate of the capacitor 30 may also be affected to a slight extent by the adjustment of a rheostat 36 in series with a resistor 37 between one terminal of the capacitor 30 and ground. The primary purpose of the rheostat 36 and resistor 37, however, is to provide a sharp decrease in the potential of the circuit point 29 when the device 15 conducts, which results in the application of a negative pulse to the grid 18 and a sharp decrease in the current through the impedance 10. By adjustment of the rheostat 36, the amplitude of such negative pulse may be adjusted relative to the amplitude of the increase of potential of the circuit point 29 on charging of capacitor 30, to obtain the desired linearity.

It may be noted that a direct current return for the control grid 18 of the device 15 is provided by means of a resistor 38 between the grid 18 and the cathode 20. The time constant of the coupling circuit defined by the capacitor 28 and resistor 38 may preferably be such that the voltage wave form at the grid 18 is substantially the same as the wave form at the circuit point 29.

As previously indicated, the timer circuit, which includes the device 11, is arranged to periodically restore the control circuit (the circuit as thus far described) to an initial condition. For this purpose, the anode 13 of the discharge device 11 may be connected to the circuit point 29 and the cathode 12 of the device 11 may be connected to ground, preferably through the resistor 25, so that when the device 12 conducts, the capacitor 30 may be discharged.

To control conduction of the device 11, the grid 14 may be normally biased negatively beyond cut-off and the negative bias may be decreased to less than cut-off periodically to cause conduction of the device 11 and discharge of the capacitor 30. For this purpose, the grid 14 may be connected to a resonant circuit including a capacitor 39 and an inductance 40 in parallel, the purpose of which will be described later, through a resistor 41 and through a capacitor 42 to ground. The capacitor 42 is arranged to be charged up to a polarity as indicated when the control circuit is restored to its initial condition so as to provide a negative bias for the grid 14. The capacitor 42 may then gradually discharge to provide a potential at the grid 14 increasing in a positive direction until a predetermined point is reached at which the device 11 will conduct. This discharge of the capacitor 42 may be achieved by connecting a resistance directly thereacross but preferably, the discharge path is through the resistor 41, a resistor 42a, and a rheostat 43 to the positive terminal 22. The resistance in this path, and thus the rate of discharge of the capacitor 42, may be controlled by adjustment of the rheostat 43.

A highly important feature of the present invention is in the manner in which the capacitor 42 is charged when the control circuit is restored to its initial condition. It will be noted that one side of the inductive impedance 10 is connected through the capacitor 26 to the cathode 12 of the discharge device 11. When the device 11 is caused to conduct so as to discharge the capacitor 30, the potential of the control grid 18 of the device 15 will be sharply decreased and the voltage at the cathode 16 will be sharply decreased to tend to cause a sharp decrease in the current through the inductive impedance 10. As will be appreciated by those skilled in the art, a change in current through an inductance will induce a voltage proportional to the inductance and the rate of change of current. The sharp decrease in current through the inductive impedance 10 will induce a relatively large potential of a polarity such that the side of the impedance 10 connected to ground will be highly positive with respect to the other side thereof. Such other side is connected through the capacitor 26 to the cathode 12 of the device 11 and the side of the impedance 10 connected to ground is connected to the grid 14 of the device 11 through the capacitor 42, resistor 41 and resonant circuit 39—40. Accordingly, the grid 14 of the device 11 will be at a relatively high positive potential with respect to the cathode 12. This will cause a relatively large current flow between the grid 14 and the cathode 12 and the capacitor 42 will be charged up to the polarity as indicated in the drawing. Hence the energy stored in the inductive impedance 10 and released when the control circuit is restored to its initial condition will be transferred, in part, to the capacitor 42.

It will be noted that by virtue of this circuit arrangement, there is no necessity for separate means for absorbing the energy stored in the inductive impedance 10 and neither is there any necessity for separate means for charging up the capacitor 42 to restore the timer circuit to its initial condition.

It may further be noted that because of the fact that the grid 14 is swung to a positive potential relative to the cathode 12, the conduction between the cathode 12 and the anode 13 is greatly increased and the capacitor 30 will be discharged at a rapid rate. This rapid rate of discharge of the capacitor 30 will, in turn, cause an increase in the rate of decrease of current through the inductive impedance 10. The ultimate effect of this action is to obtain an extremely abrupt restoration of the control circuit to its initial condition and an extremly fast decrease in the current flow through the impedance 10 which, of course, is highly desirable in a sweep circuit of the type to which this invention relates.

The purpose of providing the resonant circuit comprising the capacitor 39 and the inductor 40 is to accurately time the duration of each cycle of operation of the generator. When the device 11 conducts to obtain a sharp decrease in the current through the inductive impedance 10 in the resultant release of the stored energy in the impedance 10 through the grid circuit of the device 11, a certain amount of such energy will be absorbed by the inductor 40 and a certain amount will be absorbed by the capacitor 39. When the device 11 then becomes non-conductive, the resonant circuit defined by the capacitor 39 and the inductor 40 will oscillate and there will be a damped oscillatory wave voltage across the circuit. The magnitude of this voltage may be such as to insure that the device 11 will go into conduction only when the polarity of the side of the resonant circuit connected to the grid 14 is increasing relative to the polarity of the other side thereof.

Accordingly, while the approximate elapsed time between the time when the device 11 becomes non-conducting and the time when the device 11 goes into conduction will be dependent on factors such as the time constant of the circuit including capacitor 42 and resistors 41, 42a and 43, the exact time will be determined by the oscillatory action or "ringing" of the resonator circuit including capacitor 39 and inductor 40.

A specific feature of the circuit of this invention is in the fact that although it is self-timing and does not require separate timer control means, it can be readily synchronized with the operation of other circuits if such synchronization is desired. This may be accomplished very simply by connecting a signal from another circuit to a terminal 44 connected to the junction between the resistors 41 and 42.

It is believed that the operation of the circuits may be more clearly visualized by considering the wave forms of signals at various points in the circuit as shown in Figure 2. Referring thereto, reference numeral 45 designates the wave form of the voltage of the circuit point 29 with respect to ground; reference numeral 46 designates the wave form of the voltage at the grid 18 of the device 15 with respect to ground; reference numeral 47 designates the wave form of the voltage at the cathode 16 of the device 15 (or cathode 12 of the device 11) with respect to ground; reference numeral 48 designates the wave form of current through the conductive impedance 10; and reference numeral 49 designates the wave form of the voltage at the grid 14 of the device 11 with respect to ground.

At a time designated as $t_1$ in Figure 2, the capacitor 30 may be in an initial condition of charge and there may be a charging current flow through the rheostat 36 and resistor 37 so that there may be an initial voltage at the circuit point 29 at the time $t_1$, as is shown by the wave form 45. From such initial time $t_1$ until the time designated as $t_2$ in Figure 2, the potential of the circuit point 29 with respect to ground may gradually increase through the charging of the capacitor 30.

During this time period, the voltage across the capacitor 28 may be substantially constant so that the potential of the grid 18 of the device 15 also gradually increases as indicated by the wave form 46 in Figure 2. This will gradually increase the current through the inductive impedance 10, as indicated by the wave form 48, and the potential of the cathode 16 with respect to ground may likewise gradually increase as indicated by the wave form 47. As previously indicated, the rate of increase of the current flow through the inductive impedance 10 should, in most applications, be linear as is illustrated by the wave form 48.

At the time $t_1$, the capacitors 42 and 39 in the grid circuit of the device 11 may be in an initial condition of charge with the potential of the grid 14 with respect to ground being negative as is shown by the wave form 49. From the time $t_1$ to the time $t_2$, the capacitor 42 may gradually discharge and the resonant circuit 39—40 may have a damped oscillation thereacross so that the potential of the grid 14 with respect to ground may oscillate and gradually increase in a positive direction as is shown by the wave form 49.

It will be observed that the potential of the plate 13 of the device 11, which is shown by the wave form 45, will be gradually increasing and the potential of the grid 14 of the device 11 is oscillating and generally increasing and at the time $t_2$, when the condition of the resonant circuit 39—40 is such as to provide a sharply increasing potential at the grid 14, the device 11 may go into conduction.

The conduction of the device 11 will reverse the current flow through the rheostat 36 and resistor 37 and the potential of the circuit point 29 will be instantaneously reduced. From the time $t_2$ to a time indicated as $t_3$ in Figure 2, the capacitor 30 may gradually discharge through the device 11 to further lower the potential of the circuit point 29. The capacitor 28 which couples the circuit point 29 to the grid 18, may have a substantially constant voltage thereacross so that the potential of the grid 18 may be instantaneously reduced at the time $t_2$ and may thereafter further decrease to the time $t_3$.

In this time period from $t_2$ to $t_3$, the current through the inductive impedance 10 may be relatively rapidly reduced as is shown by the wave form 48 in Figure 2. At the time $t_2$ the rate of change of current with respect to time is abruptly changed from a positive value to a relatively high negative value and since there is a voltage induced in an inductance that is proportional to the rate of change of current with respect to time, the voltage at the cathode 16 (or cathode 12) with respect to ground may be abruptly changed from a slightly positive value to a relatively high negative value at the time $t_2$, as is shown by the wave form 47. From the time $t_2$ to the time $t_3$, the rate of change of current through the impedance 10 may gradually increase in a positive direction (that is the rate of change in a negative direction may gradually decrease) so that the potential of the cathode 16 may increase in this period.

When the voltage at the cathodes 16 and 12 is abruptly changed from a slightly positive value to a relatively negative value as is indicated by the wave form 47, the grid 14 of the device 11 may be positive with respect to the cathode so as to induce a relatively large current flow which will rapidly charge up the capacitor 42. After the stored energy in the impedance 10 is dissipated, this current flow may terminate.

It will be noted that during the time interval from $t_2$ to $t_3$, the potential of the anode 13 of the device 11 will be gradually decreasing as shown by the wave form 45, and the potential of the cathode 12 will be gradually increasing as shown by the wave form 47. At the time $t_3$, the relative anode, grid and cathode potentials may be such as to cause the device 11 to become non-conductive. At this time, the current flow through the rheostat 36 and the resistor 37 may reverse so that the potential at the circuit point 29 may instantaneously increase back to its condition at the initial time $t_1$. The grid 18 of the device 15 may also be instantaneously increased as indicated by the wave form 46. At this point, the grid 18 may be actually swung positive relative to the cathode 16 so as to provide a very short pulse of current flow, not indicated in the drawing, which will charge up the capacitor 28. This may provide a self-biasing action for the device 15.

At the time $t_3$, the rate of change of current through the inductive impedance 10 may be changed from a negative to a positive value as indicated by wave form 48 so that the potential of the cathodes 16 and 12 may be changed from a negative to a positive value equal to the value at the initial time $t_1$. The potential of the grid 14 of the device 11 may likewise be restored to its initial condition at the time $t_1$.

This cycle will, of course, be repeated over and over again.

It will be appreciated from the foregoing that this invention provides a sweep circuit which is very efficient, accurate and reliable in operation and which is very simply and readily constructed from a minimum number of component parts. It may be noted that although actual values of the various components are shown in the drawing to enable those skilled in the art to most readily apply the invention, it will be understood that such values are given only for illustrative purposes and are not to be construed as limitations. It may further be noted that although the discharge devices 11 and 15 may be in the form of vacuum tubes, gas tubes, transistors and other types of discharge devices may be used in the application of the invention.

The terms "cathode," "grid," and "anode" are hence to be construed to include equivalent elements of such other forms of discharge devices and likewise terms such as "positive" and "increasing" are used in a relative sense.

It will be understood that modifications and variations may be effected without departing from the spirit and scope of the novel concepts of the present invention.

I claim as my invention:

1. In a sweep circuit for applying a current wave of saw-tooth form to an inductive impedance, a control circuit arranged to start in an initial condition and then apply an increasing current through the inductive impedance, and a timer circuit comprising a discharge device having an anode, a cathode and a control grid, means for applying a positive potential to said anode relative to said cathode, means for coupling said device to said control circuit for causing restoration of said control circuit to its initial condition on conduction of said device, a capacitor, means coupling said capacitor in series between said control grid and one side of the inductive impedance, and means coupling said cathode to the other side of the inductive impedance.

2. In a sweep circuit for applying a current wave of saw-tooth form to an inductive impedance, first and second discharge devices each having a cathode, a grid and an anode, means coupling both cathodes to the negative side of the power supply through the inductive impedance, means connecting the anode of said second device to the positive side of the power supply, a first resistor, a first capacitor, means coupling the anode of said first device to the positive side of the power supply through said first resistor and to the negative side of the power supply through said first capacitor, means coupling the anode of said first device to the grid of said second device, a second resistor, a second capacitor, and means coupling said second resistor and said second capacitor in series between the control grid of said first device and the negative side of the power supply.

3. In a sweep circuit for applying a current wave of saw-tooth form to an inductive impedance, a control circuit arranged to start in an initial condition and then apply an increasing current through the inductive impedance, and a timer circuit comprising a discharge device having an anode, a cathode and a control grid, means for applying a positive potential to said anode relative to said cathode, means for coupling said device to said control circuit for causing restoration of said control circuit to its initial condition on conduction of said device, a capacitor, resonant circuit means coupling said capacitor to said grid, said capacitor being arranged to be charged from energy released by the inductive impedance on restoration of said control circuit to its initial condition to apply a cut-off bias to said grid and to thereafter discharge to cause conduction of said device after a predetermined time interval with said resonant circuit means acting to accurately time said time interval.

4. In a sweep circuit for applying a current wave of saw-tooth form to an inductive impedance, a control circuit arranged to start in an initial condition and then apply an increasing current through the inductive impedance and a timer circuit comprising a discharge device having an anode, a cathode and a control grid, means for applying a positive potential to said anode relative to said cathode, means for coupling said device to said control circuit for causing restoration of said control circuit to its initial condition on conduction of said device, a capacitor, means coupling said capacitor in series between said control grid and one side of the inductive impedance, means coupling said cathode to the other side of the inductive impedance, and resistance means arranged to couple said control grid to a point at a positive potential relative to said one side of said inductive impedance.

References Cited in the file of this patent

UNITED STATES PATENTS

| | | |
|---|---|---|
| 2,221,015 | Wilson | Nov. 12, 1940 |
| 2,248,975 | Faudell | July 15, 1941 |
| 2,419,772 | Gottier | April 29, 1947 |
| 2,553,165 | Bliss | May 15, 1951 |